(12) United States Patent
Arata et al.

(10) Patent No.: US 11,988,497 B2
(45) Date of Patent: May 21, 2024

(54) OPTICAL UNIT AND FILM THICKNESS MEASUREMENT DEVICE

(71) Applicant: HAMAMATSU PHOTONICS K.K., Hamamatsu (JP)

(72) Inventors: Ikuo Arata, Hamamatsu (JP); Satoshi Takimoto, Hamamatsu (JP); Kenichi Ohtsuka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 226 days.

(21) Appl. No.: 17/634,298

(22) PCT Filed: Aug. 31, 2020

(86) PCT No.: PCT/JP2020/032919
§ 371 (c)(1),
(2) Date: Feb. 10, 2022

(87) PCT Pub. No.: WO2021/106299
PCT Pub. Date: Jun. 3, 2021

(65) Prior Publication Data
US 2022/0333913 A1    Oct. 20, 2022

(30) Foreign Application Priority Data
Nov. 26, 2019  (JP) ................. 2019-213046

(51) Int. Cl.
*G01B 11/06* (2006.01)
*G01B 5/06* (2006.01)
(Continued)

(52) U.S. Cl.
CPC ............ *G01B 11/0625* (2013.01); *G01B 5/06* (2013.01); *G01B 11/02* (2013.01); *G01B 11/06* (2013.01);
(Continued)

(58) Field of Classification Search
CPC ...... G01B 11/0625; G01B 5/06; G01B 11/02; G01B 11/06; G02B 17/0816;
(Continued)

(56) References Cited

U.S. PATENT DOCUMENTS

| 8,885,173 B2* | 11/2014 | Ohtsuka ............. G01B 11/0625 356/504 |
| 2003/0202238 A1* | 10/2003 | Tsurumune ............ G02B 21/16 359/368 |
| 2016/0349038 A1* | 12/2016 | Ohtsuka ............... G01N 21/896 |

FOREIGN PATENT DOCUMENTS

| CN | 101375152 A | 2/2009 |
| CN | 101506962 A | 8/2009 |

(Continued)

OTHER PUBLICATIONS

English-language translation of International Preliminary Report on Patentability (IPRP) dated Jun. 9, 2022 that issued in WO Patent Application No. PCT/JP2020/032919.

*Primary Examiner* — Jonathan M Hansen
(74) *Attorney, Agent, or Firm* — Faegre Drinker Biddle & Reath LLP

(57) ABSTRACT

An optical unit includes an input portion configured to have measurement light having a wavelength extending from an ultraviolet region to a visible region input thereto, an optical system configured to condense the measurement light in a state where a chromatic aberration is caused to occur, and an opening portion configured not to image light having a wavelength in the visible region and to image light having a wavelength in the ultraviolet region of the measurement light having a chromatic aberration having occurred therein.

11 Claims, 11 Drawing Sheets

(51) Int. Cl.
*G01B 11/02* (2006.01)
*G02B 17/08* (2006.01)

(52) U.S. Cl.
CPC ..... *G02B 17/0816* (2013.01); *G02B 17/0868* (2013.01)

(58) Field of Classification Search
CPC ........... G02B 17/0868; G01N 21/8422; G01N 21/255; G01N 21/314; G01N 21/4738; G01N 2021/3155; G01N 2021/4742; G01N 2021/8427; G01N 2201/08
See application file for complete search history.

(56) References Cited

FOREIGN PATENT DOCUMENTS

| | | | |
|---|---|---|---|
| CN | 102914268 | A | 2/2013 |
| JP | H9-014925 | A | 1/1997 |
| JP | 2005-121522 | A | 5/2005 |
| JP | 2006-284701 | A | 10/2006 |
| JP | 2007-140013 | A | 6/2007 |
| JP | 2007-198771 | A | 8/2007 |
| JP | 2019-120607 | A | 7/2019 |
| TW | 200710370 | A | 3/2007 |

\* cited by examiner

OPTICAL UNIT AND FILM THICKNESS MEASUREMENT DEVICE

TECHNICAL FIELD

The present disclosure relates to an optical unit and a film thickness measurement device.

BACKGROUND ART

Recently, devices, which can realize a high-density storage compared to 2D memories in the related art, have been attracting attention. A high-density storage device is constituted by vertically stacking layers of data storage cells. For example, each data storage cell has a multilayer film structure in which silicon oxide films and silicon nitride films are repeatedly stacked on a silicon substrate, and a pair of a silicon oxide film and a silicon nitride film forms one data storage cell. Since a memory capacity of the device is proportional to the number of pairs of a silicon oxide film and a silicon nitride film, multilayering and thinning of devices have been progressing. A non-uniform film thickness affects electrical characteristics of a device. A non-uniform film formation rate causes deterioration in productivity due to increase in cleaning. Therefore, the importance of quality control of a film thickness and process control of film formation in manufacturing devices is increasing.

In a case of considering application to an in-line film thickness monitor, a film thickness measurement technique (spectroscopic method) utilizing spectroscopy can be mentioned. When a spectroscopic method is used, a measurement head is easily embedded into a film formation device, and there are few restrictions on embodiments. Therefore, it is easy to be applied to an in-line film thickness monitor compared to a cross-sectional observation technology. For example, in the film thickness measurement device described in Patent Literature 1, candidates for an optimal solution to a film thickness are obtained using a result of comparison between an actual measurement reflectance and a theoretical reflectance for each wavelength of a measurement target in a first wavelength range, and the optimal solution to the film thickness is determined from the candidates for the optimal solution using a result of comparison between the actual measurement reflectance and the theoretical reflectance for each wavelength of a measurement target S in a second wavelength range different from the first wavelength range.

CITATION LIST

Patent Literature

[Patent Literature 1] Japanese Unexamined Patent Publication No. 2019-120607

SUMMARY OF INVENTION

Technical Problem

An amount of change in a reflectance spectrum with respect to a film thickness of a multilayer film tends to be larger in an ultraviolet region than in a visible region. For this reason, in the current circumstances in which multilayering and thinning of devices have been progressing, from a viewpoint of improving measurement accuracy, it is considered effective to perform spectroscopy using light in the ultraviolet region. However, when dealing with light in the ultraviolet region, there are various technical problems, such as stray light, dispersion, scattering, luminance, durability, and costs. Particularly, when an intensity of light in the visible region drastically exceeds that of light in the ultraviolet region, an exposure time is limited to a range in which a sensitivity of light in the visible region is not saturated in a detection system, and thus there is concern that it may be difficult to obtain a required sensitivity of light in the ultraviolet region. For this reason, there is a demand for a technology capable of constituting a spectrum which is optimal for film thickness measurement.

The present disclosure has been made in order to resolve the foregoing problems, and an object thereof is to provide an optical unit capable of constituting a spectrum which is optimal for film thickness measurement, and a film thickness measurement device using this.

Solution to Problem

An optical unit according to an aspect of the present disclosure includes an input portion configured to have light having a wavelength extending from an ultraviolet region to a visible region input thereto, an optical system configured to condense the light in a state where a chromatic aberration is caused to occur, and an opening portion configured not to image light having a wavelength in the visible region and to image light having a wavelength in the ultraviolet region of the light having the chromatic aberration having occurred therein.

In this optical unit, a chromatic aberration is caused to occur in input light so that light having a wavelength in the visible region is not imaged and light having a wavelength in the ultraviolet region is imaged in the opening portion. In this optical unit, a spectral intensity in the ultraviolet region of light output from the opening portion can be relatively increased with respect to a spectral intensity in the visible region. Therefore, a sensitivity of light in the ultraviolet region required in a detection system is likely to be obtained so that a spectrum which is optimal for film thickness measurement can be constituted.

The optical system may further include a diffusion plate disposed along an optical axis of the light. When light having a wavelength in the ultraviolet region is imaged in the opening portion utilizing a chromatic aberration, in light in the visible region which is not imaged in the opening portion, only a component having a comparatively small numerical aperture is incident on the opening portion. For this reason, it is conceivable that a distribution of an emission angle for each wavelength of light output from the opening portion will greatly vary. In contrast, the distribution of the emission angle for each wavelength of light output from the opening portion can be made uniform by disposing the diffusion plate along the optical axis of light.

The diffusion plate may be disposed along the optical axis of the light between the optical system and the opening portion. In this case, a diffusion plate having a small size with respect to light condensed by the optical system can be disposed. Therefore, miniaturization of the optical unit can be achieved. In addition, a loss in quantity of light can be minimized by disposing the diffusion plate in the immediate vicinity of the opening portion.

The optical system may be configured to include a lens and a parabolic mirror. Occurrence of a greater chromatic aberration than necessary with respect to light having a wavelength in the ultraviolet region and the visible region can be curbed by combining the lens and the parabolic mirror.

The optical system may be configured to include a plane parallel plate or a wedge prism. Occurrence of a greater chromatic aberration than necessary with respect to light having a wavelength in the ultraviolet region and the visible region can be curbed by combining the plane parallel plate or the wedge prism and the parabolic mirror. When the plane parallel plate is used, a comparatively small chromatic aberration can be caused to occur. The wedge prism is significant when the numerical aperture for light is comparatively small.

The opening portion may be an input end toward an optical fiber. In this case, light in which the spectral intensity in the ultraviolet region is relatively increased with respect to the spectral intensity in the visible region can be introduced into the optical fiber.

The opening portion may be a pin hole. In this case, light in which the spectral intensity in the ultraviolet region is relatively increased with respect to the spectral intensity in the visible region can be taken out via the pin hole.

A film thickness measurement device according to another aspect of the present disclosure includes the foregoing optical unit, a light source configured to input light having a wavelength extending from an ultraviolet region to a visible region to the optical unit, a light guide portion configured to guide light output from the optical unit via the opening portion to a measurement object as measurement light, a detection portion configured to spectrally detect detected light from the measurement object, and an analysis portion configured to analyze a film thickness of the measurement object on the basis of detection results of the detection portion.

In this film thickness measurement device, light in which the spectral intensity in the ultraviolet region is relatively increased with respect to the spectral intensity in the visible region is output from the optical unit as the measurement light. Therefore, the sensitivity of light in the ultraviolet region required in the detection system is likely to be obtained so that a spectrum which is optimal for film thickness measurement can be constituted.

The light input from the light source to the optical unit may include a wavelength range of 200 nm to 300 nm. An amount of change in a reflectance spectrum with respect to the film thickness of a multilayer film tends to be larger in an ultraviolet region than in a visible region. Therefore, when light input from the light source to the optical unit includes the foregoing wavelength range, improvement of measurement accuracy can be achieved.

The light input from the light source to the optical unit may include a wavelength range of 300 nm to 800 nm. When light input from the light source to the optical unit includes the foregoing wavelength range, balance of an intensity spectrum of detected light can be maintained and improvement of measurement accuracy can be achieved.

The light input from the light source to the optical unit may include a wavelength range of 300 nm to 1,100 nm. When light input from the light source to the optical unit includes the foregoing wavelength range, balance of the intensity spectrum of detected light can be maintained and, improvement of measurement accuracy can be achieved.

Advantageous Effects of Invention

According to the present disclosure, a spectrum which is optimal for film thickness measurement can be constituted.

DESCRIPTION OF EMBODIMENT

Hereinafter, a preferable embodiment of a film thickness measurement device and a film thickness measurement method according to an aspect of the present invention will be described in detail with reference to the drawings.

Figure 1:
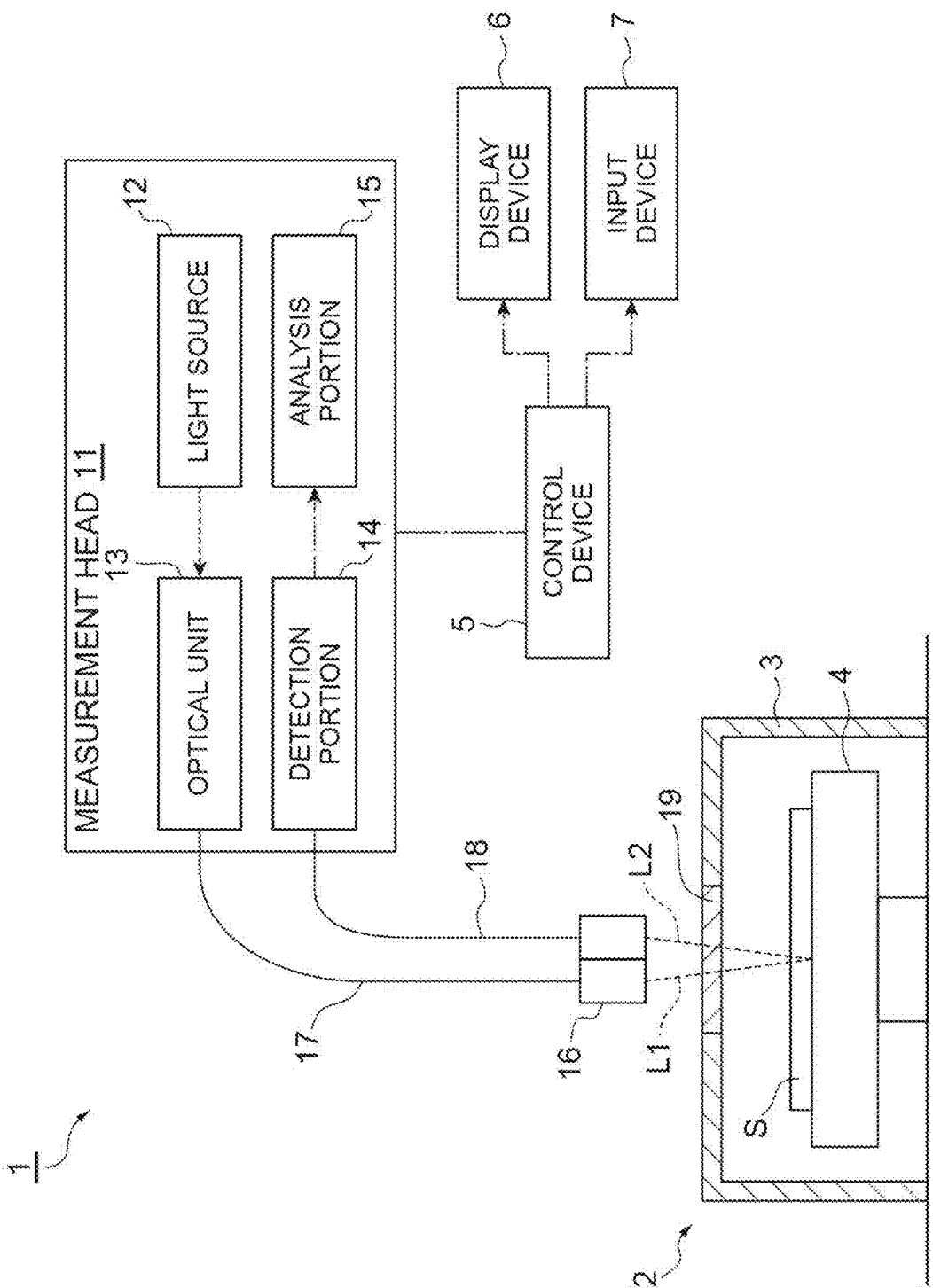
FIG. 1 is a view of a schematic constitution illustrating an embodiment of a film thickness measurement device.

FIG. 1 is a view of a schematic constitution illustrating an embodiment of a film thickness measurement device. This film thickness measurement device 1 is a device for measuring a film thickness of a film constituting a measurement object S. In the present embodiment, the film thickness measurement device 1 is constituted as an in-line film thickness monitor in a film formation device 2. For example, the measurement object S is a device having a multilayer film structure in which a plurality of first films and a plurality of second films are alternately stacked on a substrate. The measurement object S is disposed on a stage 4 provided inside a chamber 3 of the film formation device 2.

As illustrated in FIG. 1, a control device 5 is connected to the film thickness measurement device 1. The control device 5 is a device for controlling operation of the film thickness measurement device 1. For example, it is constituted of a computer. For example, the computer is constituted to include a memory such as a RAM or a ROM, a processor (computation circuit) such as a CPU, a communication interface, and a storage portion such as a hard disk. Examples of the computer include a personal computer, a microcomputer, a cloud server, and a smart-device (a smartphone, a tablet terminal, and the like).

A display device 6 such as a monitor, and an input device 7 such as a keyboard, a mouse, and the like are connected to the control device 5. For example, the display device 6 displays a film thickness measured by the film thickness measurement device 1, set measurement conditions, and the like. In addition, the input device 7 executes various kinds of inputs such as an input for starting measurement and an input of measurement conditions with respect to the control device 5 on the basis of an operation of a user. The control device 5, the display device 6, and the input device 7 may be embedded into the film thickness measurement device 1 as constituents thereof.

As illustrated in FIG. 1, the film thickness measurement device 1 has a measurement head 11. The measurement head 11 is constituted to include a light source 12, an optical unit 13, a detection portion 14, and an analysis portion 15. In addition, a light input/output portion 16 is connected to the measurement head 11. The light source 12 outputs measurement light L1 to the measurement object S. For example, the light source 12 is constituted of a light source device which outputs white light including a wavelength in an ultraviolet region (200 nm to 300 nm) and a wavelength in a visible region (300 nm to 800 nm). Examples of the light source device include a laser-excited plasma light source. For example, the light source device may be a xenon lamp or a lamp in which a deuterium lamp and a halogen lamp are combined.

The optical unit 13 is a unit for adjusting a spectral intensity of the measurement light L1 output from the measurement head 11. This optical unit 13 has a function of relatively increasing the spectral intensity in the ultraviolet region of the measurement light L1 with respect to the spectral intensity in the visible region. The optical unit 13 will be described below in detail.

The detection portion 14 is a part for detecting detected light L2 from the measurement object S. For example, the detection portion 14 is constituted of a multi-channel-type spectral detector. For example, the detection portion 14 performs spectroscopy of the detected light L2 into each of wavelength components using a spectral element such as a grating or a prism and detects an intensity of light of each of the wavelengths subjected to spectroscopy using an optical sensor group. For example, the optical sensor group is constituted of a plurality of light receiving portions which are arrayed in a one-dimensional manner. The optical sensor group detects the intensity of light of each of the wavelength components in the detected light L2 using the light receiving portions corresponding to the respective wavelengths and outputs detection results to the analysis portion 15.

The light input/output portion 16 is a part for performing irradiation with the measurement light L1 and reception of the detected light L2 with respect to the measurement object S disposed inside the chamber 3 of the film formation device 2. For example, the light input/output portion 16 is optically connected to the optical unit 13 by an optical fiber 17 and is optically connected to the detection portion 14 by an optical fiber 18, and the light input/output portion 16 is disposed in the vicinity of a viewport 19 provided in the chamber 3 of the film formation device 2.

The measurement light L1 from the light input/output portion 16 is guided by the optical fiber 17 and is incident on the measurement object S through the viewport 19. The detected light L2 from the measurement object S is incident on the light input/output portion through the viewport 19. The detected light L2 incident on the light input/output portion 16 is guided by the optical fiber 18 and is incident on the detection portion 14. In the example in FIG. 1, reflected light of the measurement light L1 reflected by the measurement object S is used as the detected light L2, but the detected light L2 may be transmitted light of the measurement light L1 which has been transmitted through the measurement object S.

The analysis portion 15 is a part for analyzing the film thickness of a film constituting the measurement object S. For example, similar to the control device 5, the analysis portion 15 may be constituted of a computer or may be constituted of an integrated circuit such as a field-programmable gate array (FPGA). When detection results of the intensity of light of each of the wavelength components of the detected light L2 are received from the detection portion 14, the analysis portion 15 analyzes each of the film thicknesses of the first films and the film thicknesses of the second films of the measurement object S on the basis of the detection results.

Subsequently, the foregoing optical unit 13 will be described in detail.

Figure 2:
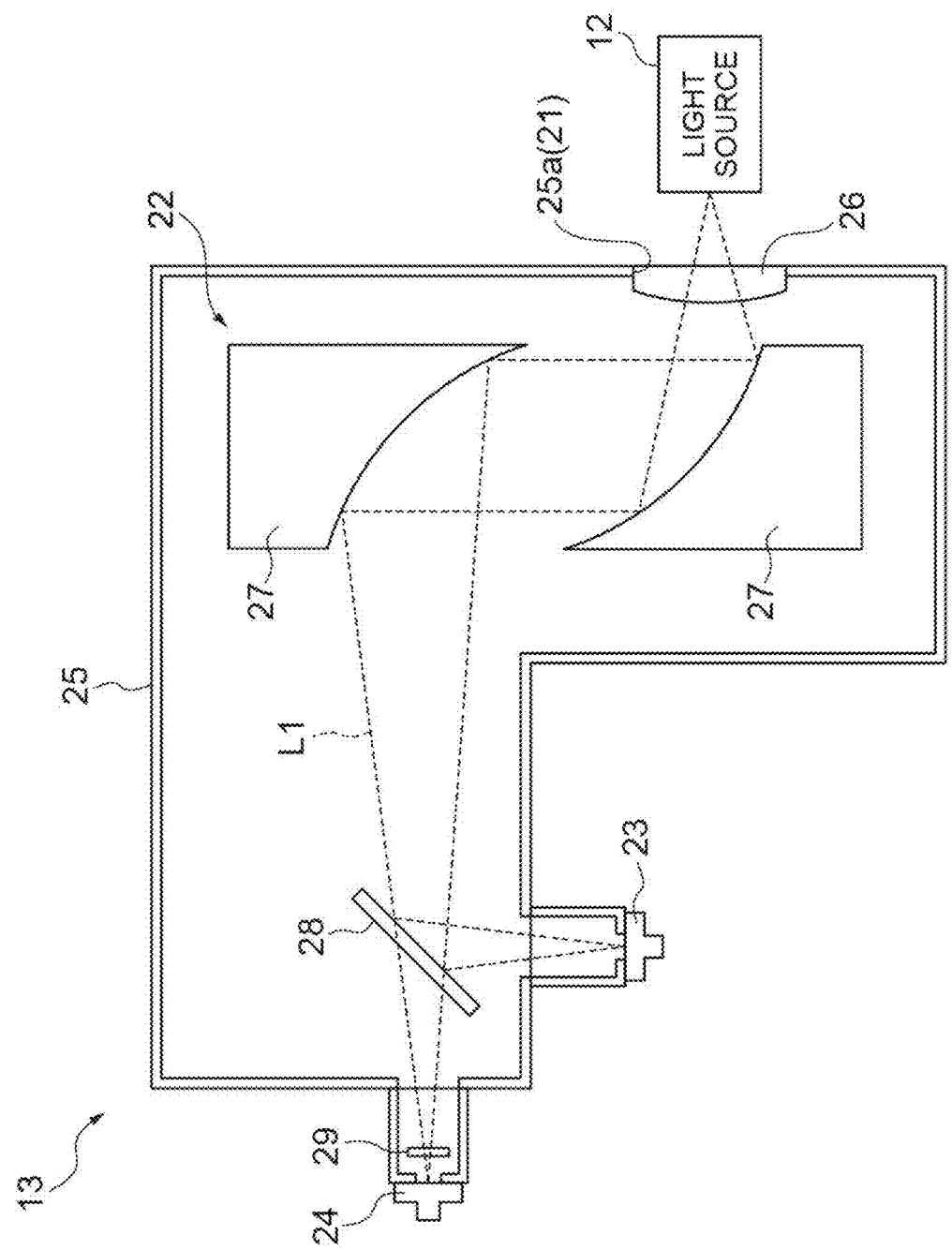
FIG. 2 is a view of a schematic constitution illustrating an embodiment of an optical unit.

FIG. 2 is a view of a schematic constitution illustrating an embodiment of an optical unit. As described above, the optical unit 13 is a unit for adjusting the spectral intensity of the measurement light L1 output from the light source 12. As illustrated in FIG. 2, the optical unit 13 is constituted to include an input portion 21, an optical system 22, a monitor output portion 23, and a measurement output portion 24 inside a casing 25. The input portion 21, the optical system 22, the monitor output portion 23, and the measurement output portion 24 are optically coupled to each other. The input portion 21 is a part to which light having a wavelength extending from the ultraviolet region to the visible region is input. For example, the input portion 21 is a hole portion 25a provided in a wall portion of the casing 25. An emission port for the measurement light L1 in the light source 12 abuts or approaches the hole portion 25a. The measurement light L1 output from the light source 12 is input to the inside of the casing 25 through the hole portion 25a.

The optical system 22 is a part for condensing the measurement light L1 in a state where a chromatic aberration is caused to occur. In the example in FIG. 2, the optical system 22 is constituted of a lens 26, a pair of parabolic mirrors 27 and 27, a beam splitter 28, and a diffusion plate 29. The lens 26 is disposed so as to block the hole portion 25a. A chromatic aberration occurs in the measurement light L1 which has passed through the lens 26 due to dispersion of a lens material. For example, the parabolic mirrors 27 are off-axis parabolic mirrors.

The measurement light L1 which has passed through the lens 26 is reflected by one parabolic mirror 27 and is collimated. The collimated measurement light L1 is reflected by the other parabolic mirror 27 and is condensed toward the measurement output portion 24. The beam splitter 28 is disposed along an optical axis of the measurement light L1 from the other parabolic mirror 27 toward the measurement output portion 24 and reflects a part of the measurement light L1 toward the monitor output portion 23. A reflectance of the beam splitter 28 is 8%, for example, due to surface reflection of an uncoated glass. The reflectance of the beam splitter 28 may be further increased by means of coating with chromium or the like. For example, a part of the measurement light L1 output from the monitor output portion 23 is utilized for drift correction of the light source 12. The rest of the measurement light L1 which has been transmitted through the beam splitter 28 passes through the diffusion plate 29 and then is incident on the measurement output portion 24. The measurement light L1 output from the measurement output portion 24 is incident on the optical fiber 17 (refer to FIG. 1) and is guided to the light input/output portion 16. As necessary, a shutter for blocking the measurement light L1 may be provided in the monitor output portion 23 and the measurement output portion 24.

Figure 3:
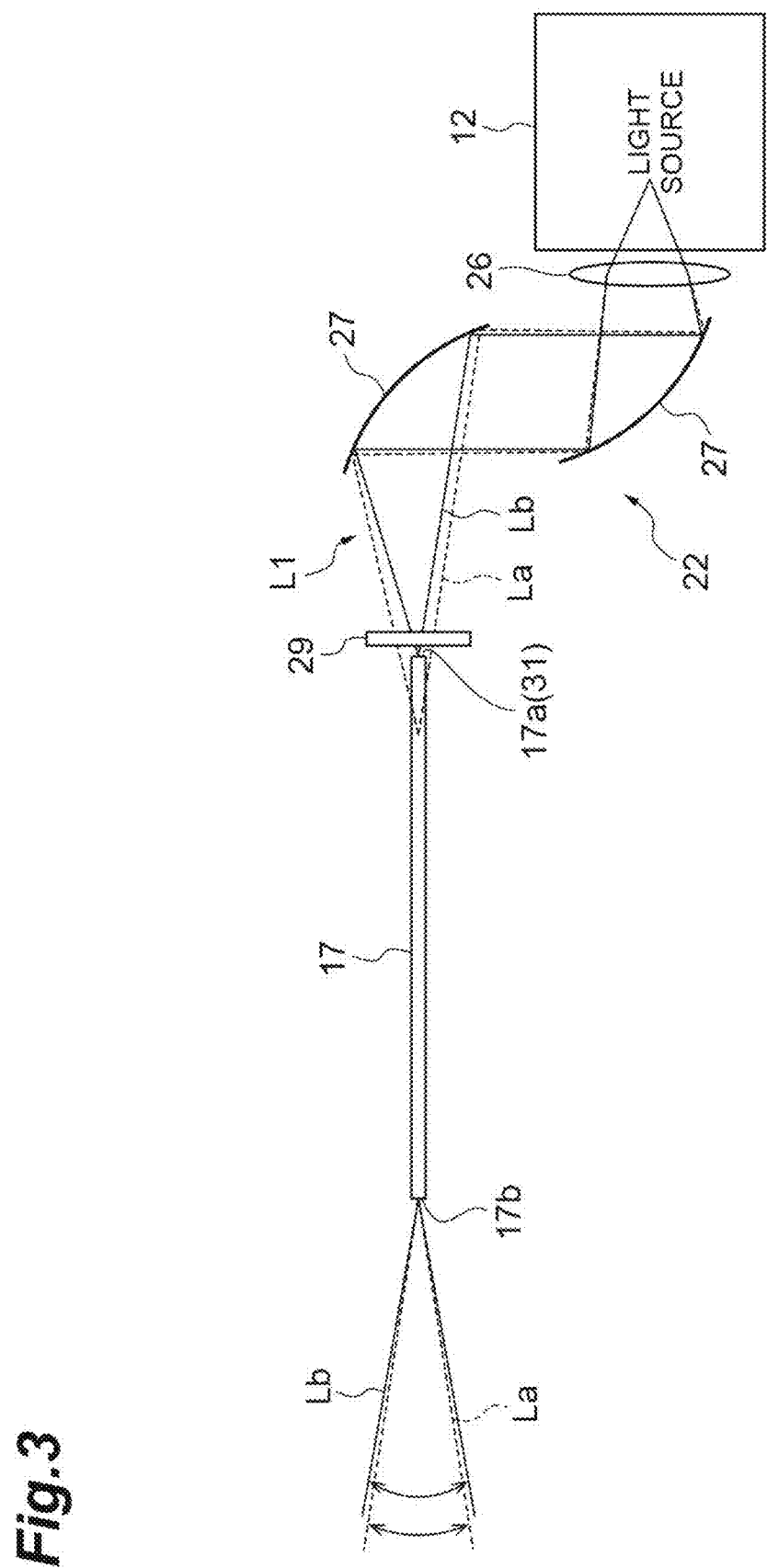
FIG. 3 is a schematic view illustrating a situation of condensing measurement light.

The measurement output portion 24 has an opening portion 31 for imaging the measurement light L1. In the present embodiment, the measurement output portion 24 is a connector to which the optical fiber 17 is connected. As illustrated in FIG. 3, the opening portion 31 is constituted of an input end 17a toward the optical fiber 17. As described above, a chromatic aberration occurs in the measurement light L1 due to the lens 26. Due to this chromatic aberration, in the wavelength components included in the measurement light L1, a focal point position of a long wavelength component is shifted to a front side in an optical axis direction, and a focal point position of a short wavelength component is shifted to a rear side in the optical axis direction. The opening portion 31 is disposed at a position where it does not image light La having a wavelength in the visible region and images light Lb having a wavelength in the ultraviolet region of the measurement light L1 having a chromatic aberration having occurred therein.

Figure 4:
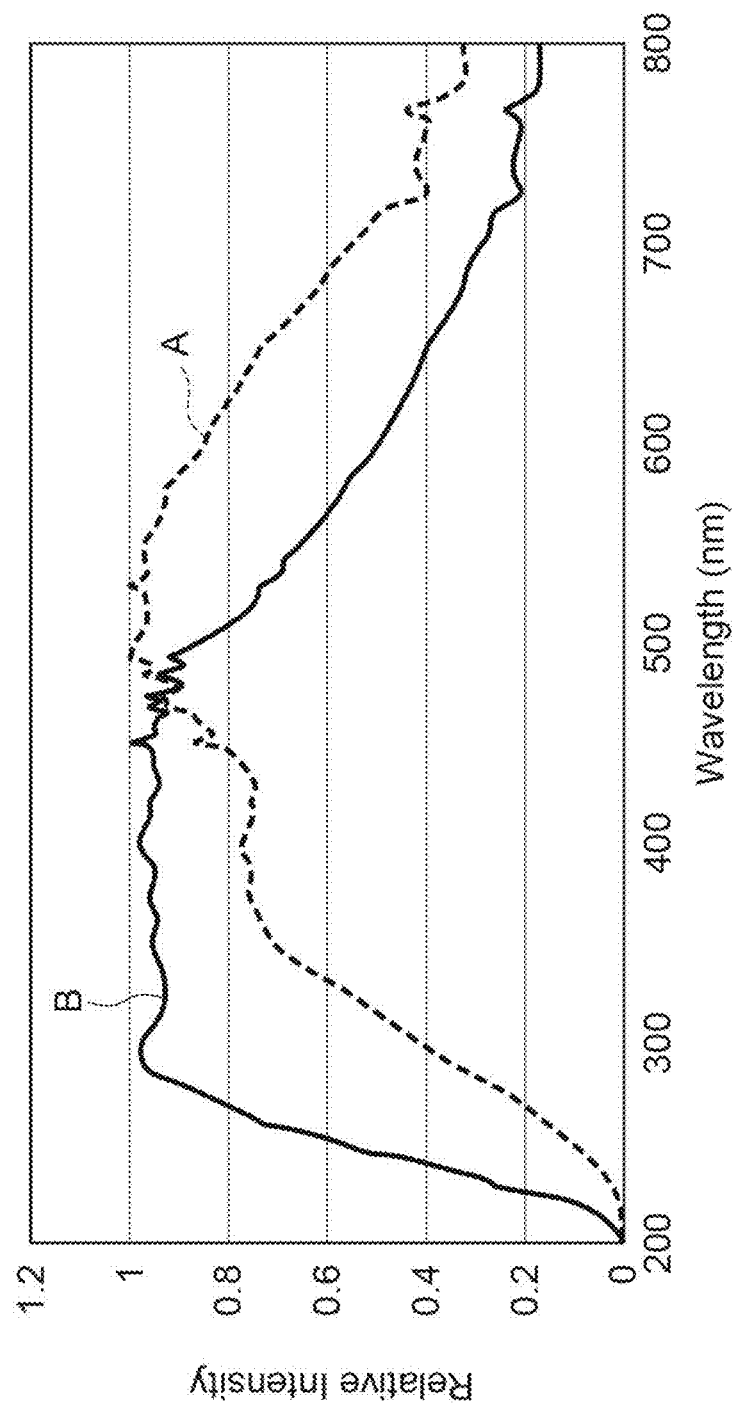
FIG. 4 is a view illustrating a spectral waveform of measurement light adjusted by the optical unit.

Accordingly, in the measurement light L1 output from the measurement output portion 24, the spectral intensity in the ultraviolet region is relatively increased with respect to the spectral intensity in the visible region. FIG. 4 is a view illustrating a spectral waveform of measurement light adjusted by the optical unit. In FIG. 4, the horizontal axis indicates wavelengths (nm), and the vertical axis indicates relative intensities (standardized with a peak value as 1). As illustrated in FIG. 4, the spectral waveform of the measurement light L1 output from the light source 12 is an arched waveform having a first peak in the vicinity of a wavelength 550 nm and a second peak in the vicinity of a wavelength 380 nm (graph A). In contrast, in the spectral waveform of the measurement light L1 output from the optical unit 13, the balance of the spectral intensity in the visible region with respect to the spectral intensity in the ultraviolet region is adjusted. As a result, a waveform having a flat peak within a range of a wavelength 280 nm to a wavelength 500 nm (graph B).

Figure 5:
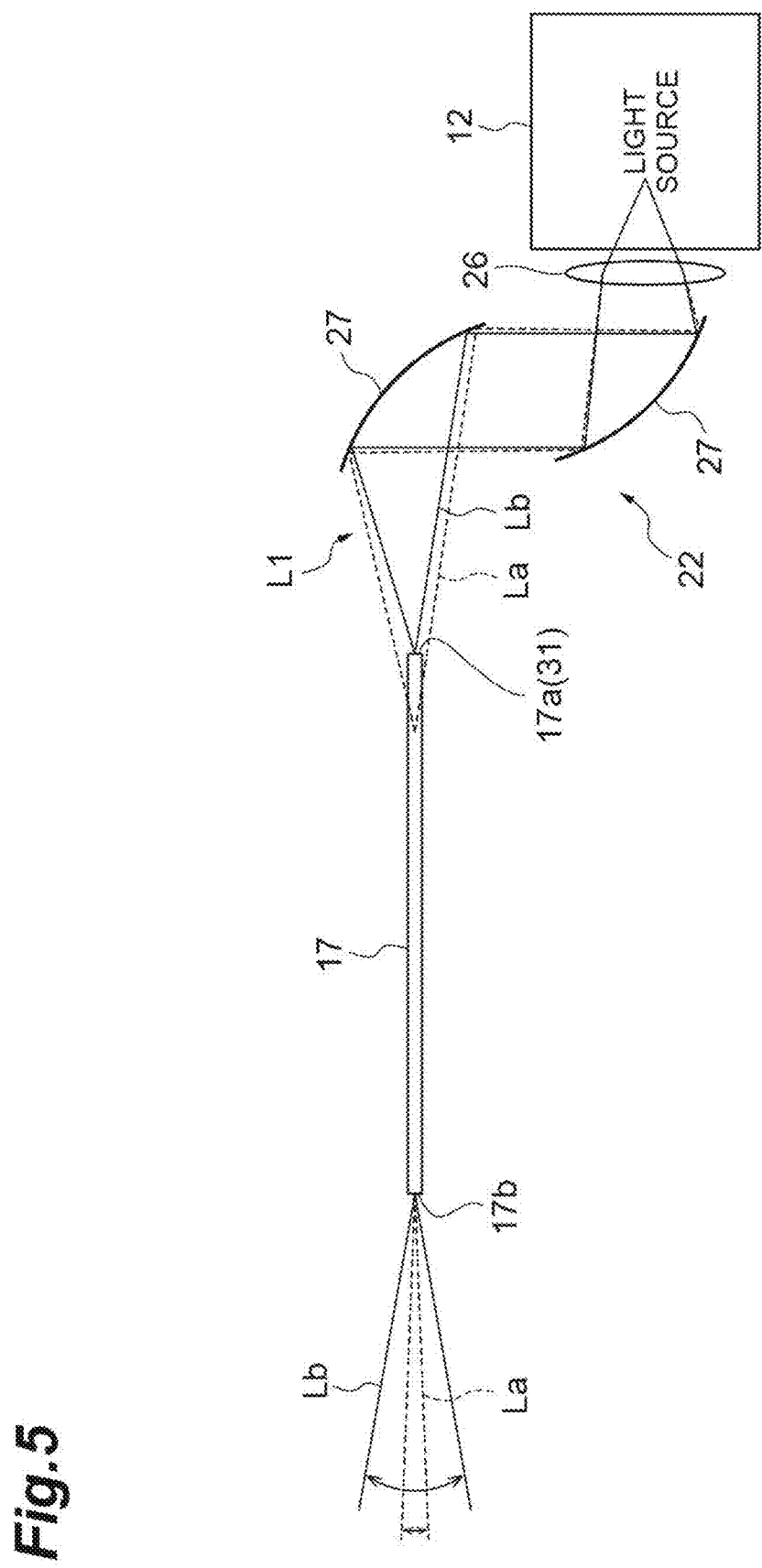
FIG. 5 is a schematic view illustrating a situation of condensing measurement light when there is no diffusion plate.

As illustrated in FIGS. 2 and 3, the diffusion plate 29 is disposed between the optical system 22 and the opening portion 31 along the optical axis of the measurement light L1. In the present embodiment, the diffusion plate 29 is disposed immediately before the opening portion 31 (input end 17a). When light having a wavelength in the ultraviolet region is imaged in the opening portion 31 utilizing a chromatic aberration, in light in the visible region which is not imaged in the opening portion 31, only a component having a comparatively small numerical aperture is incident on the opening portion 31. For this reason, as illustrated in FIG. 5, it is conceivable that a distribution of an emission angle for each wavelength of light output from the opening portion 31 (here, light output from an output end 17b of the optical fiber 17) will greatly vary.

As in the present embodiment, in a form in which the measurement light L1 from the optical unit 13 is guided to the light input/output portion 16 by the optical fiber 17, it is assumed that vibration is applied to the optical fiber 17. In this case, it is conceivable that the balance of the spectral intensity of the detected light L2 ultimately detected by the detection portion 14 change and an error in film thickness measurement increase. In contrast, when a diffusion plate is disposed along the optical axis of the measurement light L1, as illustrated in FIG. 3, the distribution of the emission angle for each wavelength of light output from the opening portion 31 (output end 17b) can be made uniform. Accordingly, even when vibration is applied to the optical fiber 17, occurrence of change in balance of the spectral intensity of the detected light L2 ultimately detected by the detection portion 14 can be curbed, and increase of an error in film thickness measurement can be avoided.

As described above, in the optical unit 13 and the film thickness measurement device 1 using this, a chromatic aberration is caused to occur in the input measurement light L1, and the light La having a wavelength in the visible region is not imaged and the light Lb having a wavelength in the ultraviolet region is imaged in the opening portion 31. In this optical unit 13, the spectral intensity in the ultraviolet region of light output from the opening portion 31 can be relatively increased with respect to the spectral intensity in the visible region. Therefore, a sensitivity of light in the ultraviolet region required in a detection system is likely to be obtained so that a spectrum which is optimal for film thickness measurement can be constituted.

Regarding a technique of relatively increasing the spectral intensity in the ultraviolet region of light with respect to the spectral intensity in the visible region, a technique of causing the measurement light L1 to pass through a filter can also be considered. However, for example, when a dielectric multilayer film filter is used, in film design in which a transmittance of light having a wavelength in the visible region is actively reduced, a coating substance having absorbability with respect to light in the vicinity of a wavelength 200 nm has to be used so that it is difficult to reduce only the spectral intensity in the visible region. In addition, when an absorption filter is used, at present, there is no filter having properties of reducing only the transmittance of light in the visible region without reducing the transmittance of light in the vicinity of the wavelength 200 nm. Therefore, a technique of using a chromatic aberration as in the optical unit 13 becomes significant in relatively increasing the spectral intensity in the ultraviolet region of light with respect to the spectral intensity in the visible region.

In addition, in the optical unit 13 and the film thickness measurement device 1, the optical system 22 includes the diffusion plate 29 disposed along the optical axis of the measurement light L1. The distribution of the emission angle for each wavelength of the measurement light L1 output from the opening portion 31 can be made uniform by disposing this diffusion plate 29. Therefore, occurrence of change in the balance of the spectral intensity of the detected light L2 ultimately detected by the detection portion 14 can be curbed, and increase of an error in film thickness measurement can be avoided. In the present embodiment, the diffusion plate 29 is disposed along the optical axis of the measurement light L1 between the optical system 22 and the opening portion 31. Accordingly, a small-sized diffusion plate 29 with respect to the measurement light L1 condensed by the optical system 22 can be disposed. Therefore, miniaturization of the optical unit 13 can be achieved. In addition, a loss in quantity of light can be minimized by disposing the diffusion plate 29 in the immediate vicinity of the opening portion 31. The diffusion plate 29 is not necessarily disposed between the optical system 22 and the opening portion 31. The diffusion plate 29 may be disposed in a latter stage of the output end 17b of the optical fiber 17.

In addition, in the optical unit 13 and the film thickness measurement device 1, the optical system 22 is constituted to include the lens 26 and the parabolic mirrors 27. An optical system constituted of only a lens is generally adopted for light in the visible region. However, when dealing with light having a wavelength extending from the ultraviolet region to the visible region, it is conceivable that a greater chromatic aberration than necessary will occur. Therefore, occurrence of a greater chromatic aberration than necessary with respect to the measurement light L1 having a wavelength in the ultraviolet region and the visible region can be curbed by combining the lens 26 and the parabolic mirrors 27 as in the optical unit 13 and the film thickness measurement device 1.

In addition, in the optical unit 13 and the film thickness measurement device 1, the opening portion 31 is constituted of the input end 17a toward the optical fiber 17. In this case, the measurement light L1 of which the spectral intensity in the ultraviolet region is relatively increased with respect to the spectral intensity in the visible region can be introduced into the optical fiber 17.

Figure 6:
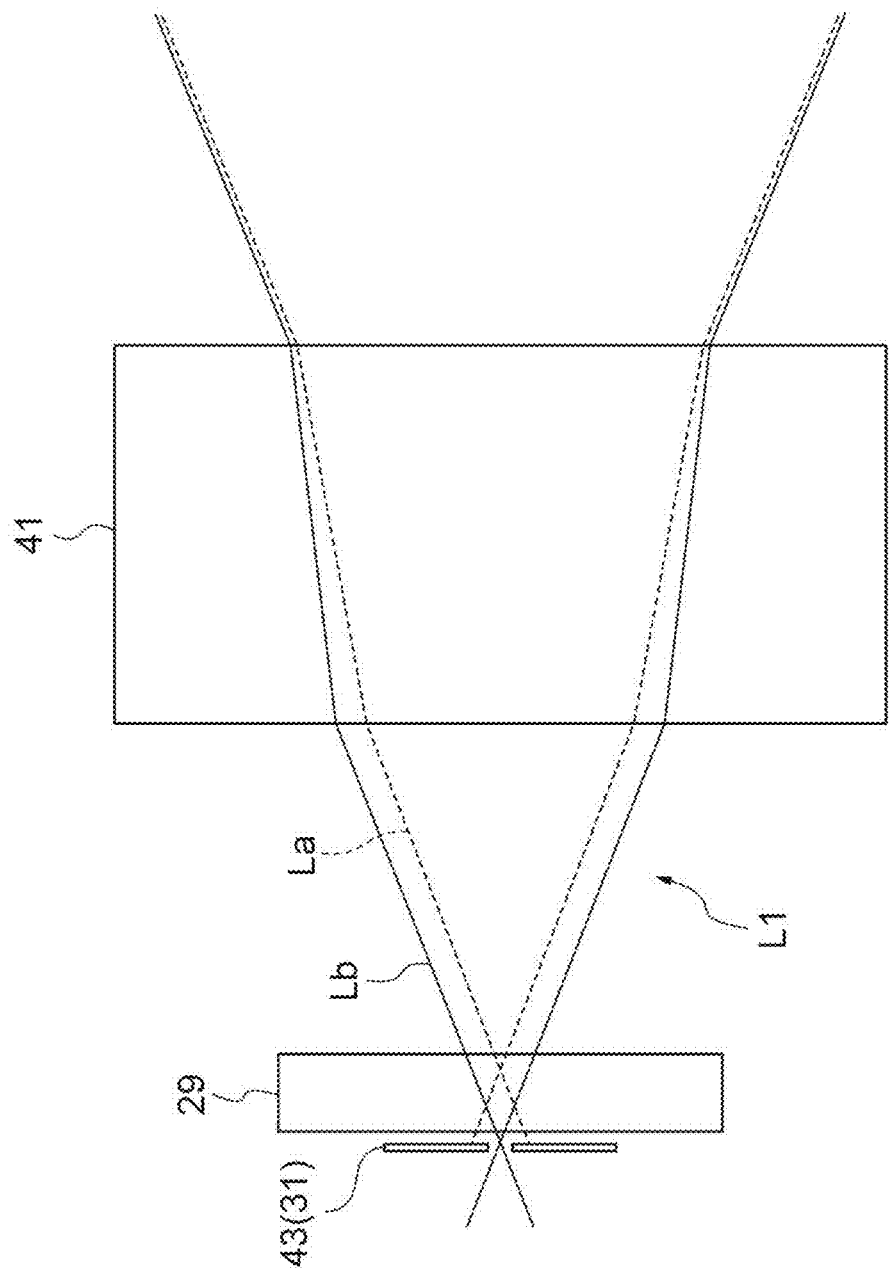
FIG. 6 is a schematic view illustrating a main part of a modification example of the optical unit.

The present disclosure is not limited to the foregoing embodiment. For example, in the foregoing embodiment, the optical system 22 is constituted to include the lens 26 and the parabolic mirrors 27. However, as illustrated in FIG. 6, in place of the lens 26, the optical system 22 may be constituted to include a plane parallel plate 41 and the parabolic mirrors 27. In the example of FIG. 6, the plane parallel plate 41 is disposed at a position between the parabolic mirrors 27 and the opening portion 31. In addition, in the example of FIG. 6, the opening portion 31 is constituted of a pin hole 43. In this manner, when the plane parallel plate 41 and the parabolic mirrors 27 are combined, a comparatively small chromatic aberration can be caused to occur.

Figure 7:
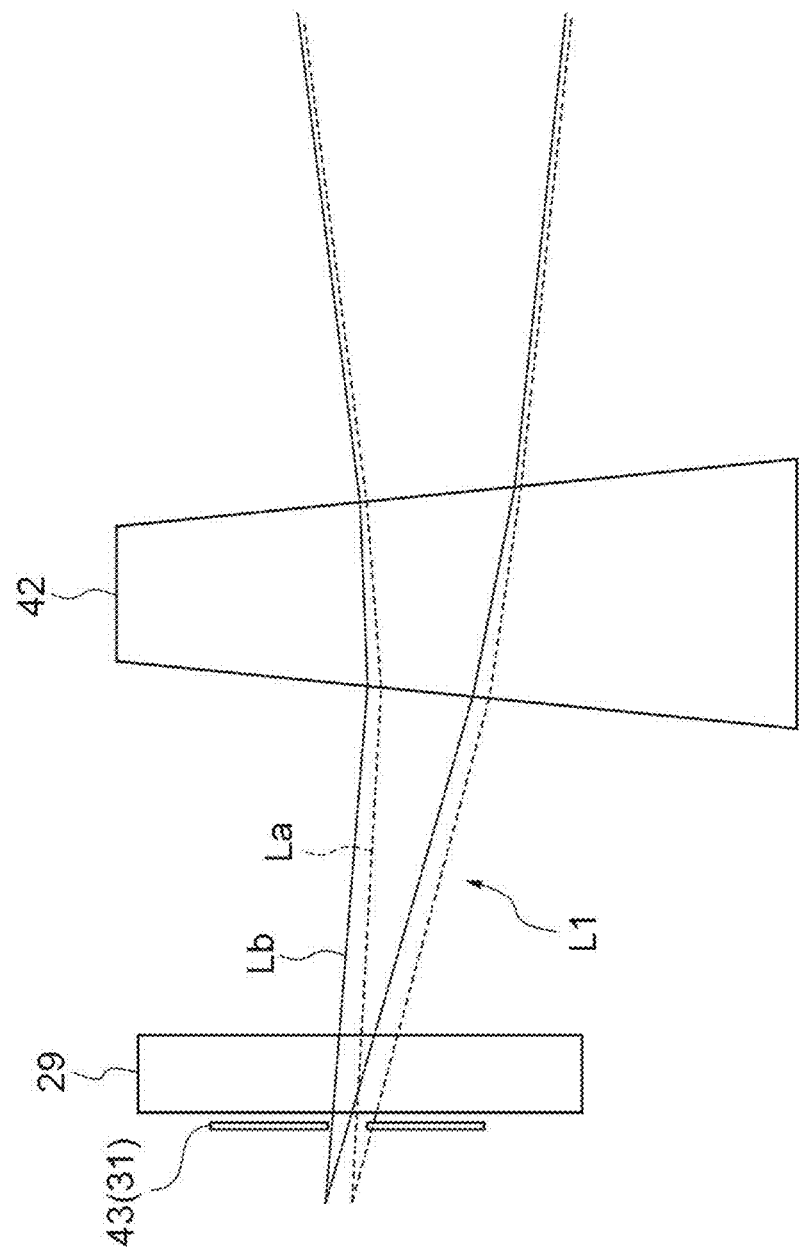
FIG. 7 is a schematic view illustrating a main part of another modification example of the optical unit.

In addition, as illustrated in FIG. 7, in place of the lens 26, the optical system 22 may be constituted to include a wedge prism 42 and the parabolic mirrors 27. In the example of FIG. 7, the wedge prism 42 is disposed at a position between the parabolic mirrors 27 and the opening portion 31. In addition, in the example of FIG. 7, similar to the case in FIG. 6, the opening portion 31 is constituted of the pin hole 43. Combination of the plane parallel plate 41 and the parabolic mirrors 27 is significant when the numerical aperture for the measurement light L1 condensed via the parabolic mirrors 27 is comparatively small. When the wedge prism 42 is used, the focal point position of a long wavelength component in the measurement light L1 is shifted to a side in a direction intersecting the optical axis with respect to the focal point position of a short wavelength component. Therefore, the spectral intensity in the ultraviolet region of light output from the opening portion 31 can be relatively increased with respect to the spectral intensity in the visible region by disposing the pin hole 43 at a position where the light Lb having a wavelength in the ultraviolet region is imaged.

There is a need for the lens 26, the diffusion plate 29, the plane parallel plate 41, and the wedge prism 42 described above to be formed of materials having transmission properties with respect to ultraviolet light. Examples of such a material include synthetic quartz, calcium fluoride, magnesium fluoride, and sapphire.

In addition, in the foregoing embodiment, for example, the light source 12 is constituted of a light source device which outputs white light including a wavelength in the ultraviolet region (200 nm to 300 nm) and a wavelength in the visible region (300 nm to 800 nm). However, for example, the light source 12 may be constituted of a light source device which outputs white light including a wavelength in the ultraviolet region (200 nm to 300 nm) and a wavelength extending from the visible region to a near infrared region (300 nm to 1,100 nm). That is, the optical unit 13 may be constituted to include the input portion 21 to which the measurement light L1 having a wavelength extending from the ultraviolet region to the near infrared region is input, the optical system 22 which condenses the measurement light L1 in a state where a chromatic aberration is caused to occur, and the opening portion 31 which does not image light La' having a wavelength extending from the visible region to the near infrared region and images the light Lb having a wavelength in the ultraviolet region of the measurement light L1 having a chromatic aberration having occurred therein. Also in such a constitution, the spectral intensity in the ultraviolet region of light output from the opening portion 31 can be relatively increased with respect to the spectral intensity from the visible region to the near infrared region. Therefore, the sensitivity of light in the ultraviolet region required in the detection system is likely to be obtained so that a spectrum which is optimal for film thickness measurement can be constituted.

The film thickness measurement device 1 is constituted as an in-line film thickness monitor in the film formation device 2, space saving of the device is required. For this reason, it is important to make the optical unit 13 applied to the film thickness measurement device 1 be further miniaturized. Hereinafter, examples of constitutions of the optical units 13 (13A to 13D) aiming at miniaturization will be described.

Figure 8:
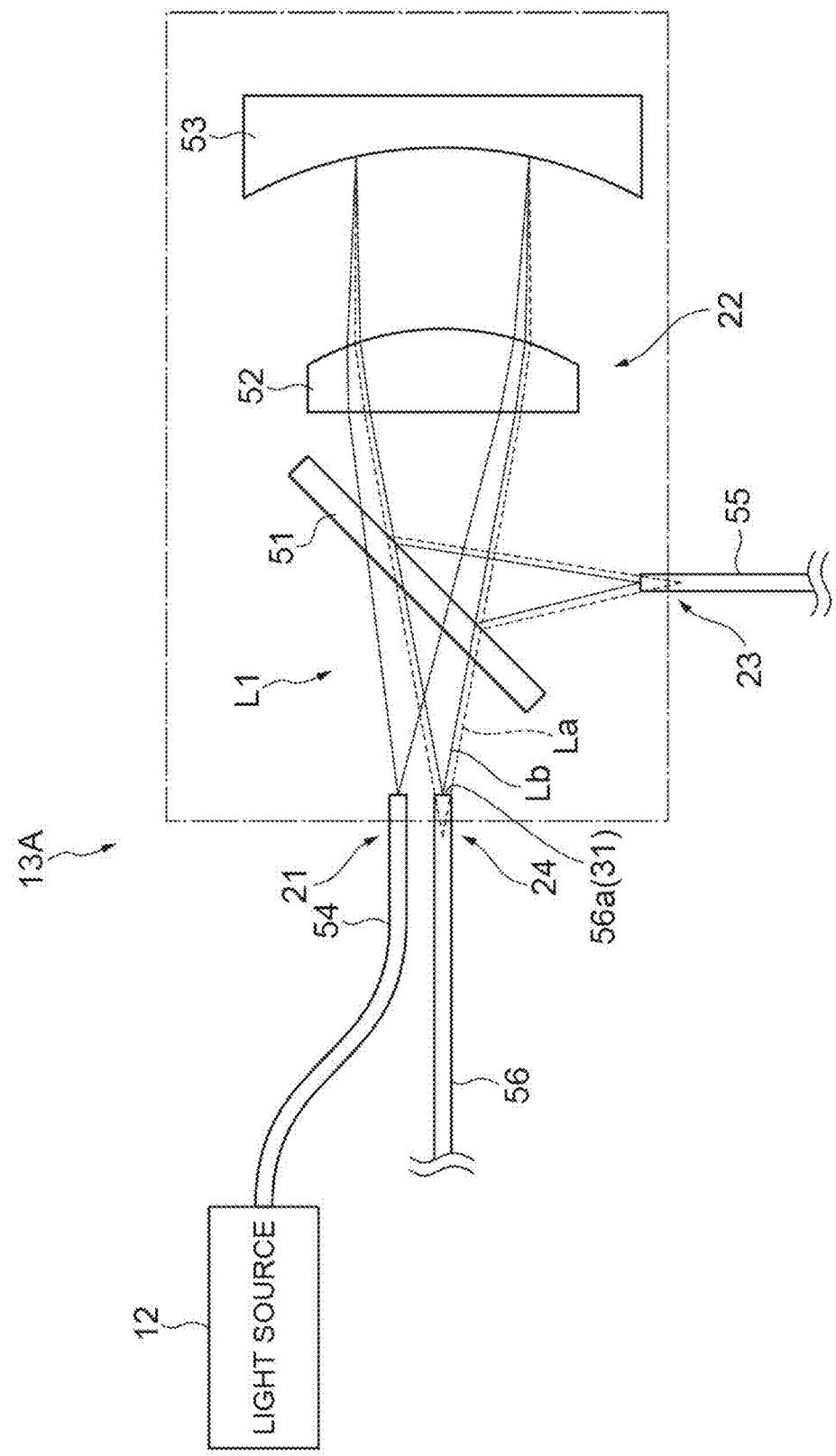
FIG. 8 is a schematic view illustrating still another modification example of the optical unit.

As illustrated in FIG. 8, the optical unit 13A is optically connected to a fiber output-type light source 12. The optical system 22 of the optical unit 13A has a beam splitter 51, a lens 52, and an ellipsoidal mirror 53. The input portion 21 is constituted of an optical fiber 54 for guiding the measurement light L1. The monitor output portion 23 is constituted of an optical fiber 55, and the measurement output portion 24 is constituted of an optical fiber 56. For example, a plane parallel plate, a wedge prism, or the like can be used as the lens 52. When the optical fiber 54 and the optical fibers 55 and 56 are sufficiently close to each other, the ellipsoidal mirror 53 can also be replaced with a spherical mirror which is less expensive. A shutter for switching between ON and OFF of the measurement light L1 may be disposed between the beam splitter 51 and the optical fibers 54, 55, and 56.

The measurement light L1 output from the light source 12 is guided to the optical unit 13A by the optical fiber 54 and is transmitted through the beam splitter 51 and the lens 52. A chromatic aberration occurs in the measurement light L1 which has passed through the lens 52 due to dispersion of the lens material. Thereafter, the measurement light L1 is reflected by the ellipsoidal mirror 53 and is incident on the beam splitter 51 again. A part of the measurement light L1 is reflected by the beam splitter 51 and is incident on the optical fiber 55 serving as the monitor output portion 23. The rest of the measurement light L1 is transmitted through the beam splitter 51 and is incident on the optical fiber 56 serving as the measurement output portion 24. An input end of the optical fiber 55 does not image the light La having a wavelength in the visible region and images the light Lb having a wavelength in the ultraviolet region of the measurement light L1 having a chromatic aberration having occurred therein. Similarly, an input end 56*a* of the optical fiber 56 (opening portion 31) does not image the light La having a wavelength in the visible region and images the light Lb having a wavelength in the ultraviolet region of the measurement light L1 having a chromatic aberration having occurred therein.

Also in such an optical unit 13A, the spectral intensity in the ultraviolet region of light output from the opening portion 31 can be relatively increased with respect to the spectral intensity in the visible region. Therefore, the sensitivity of light in the ultraviolet region required in the detection system is likely to be obtained so that a spectrum which is optimal for film thickness measurement can be constituted. In addition, due to miniaturization of the optical unit 13A, space saving of the device when used as an in-line film thickness monitor in the film formation device can be achieved.

Figure 9:
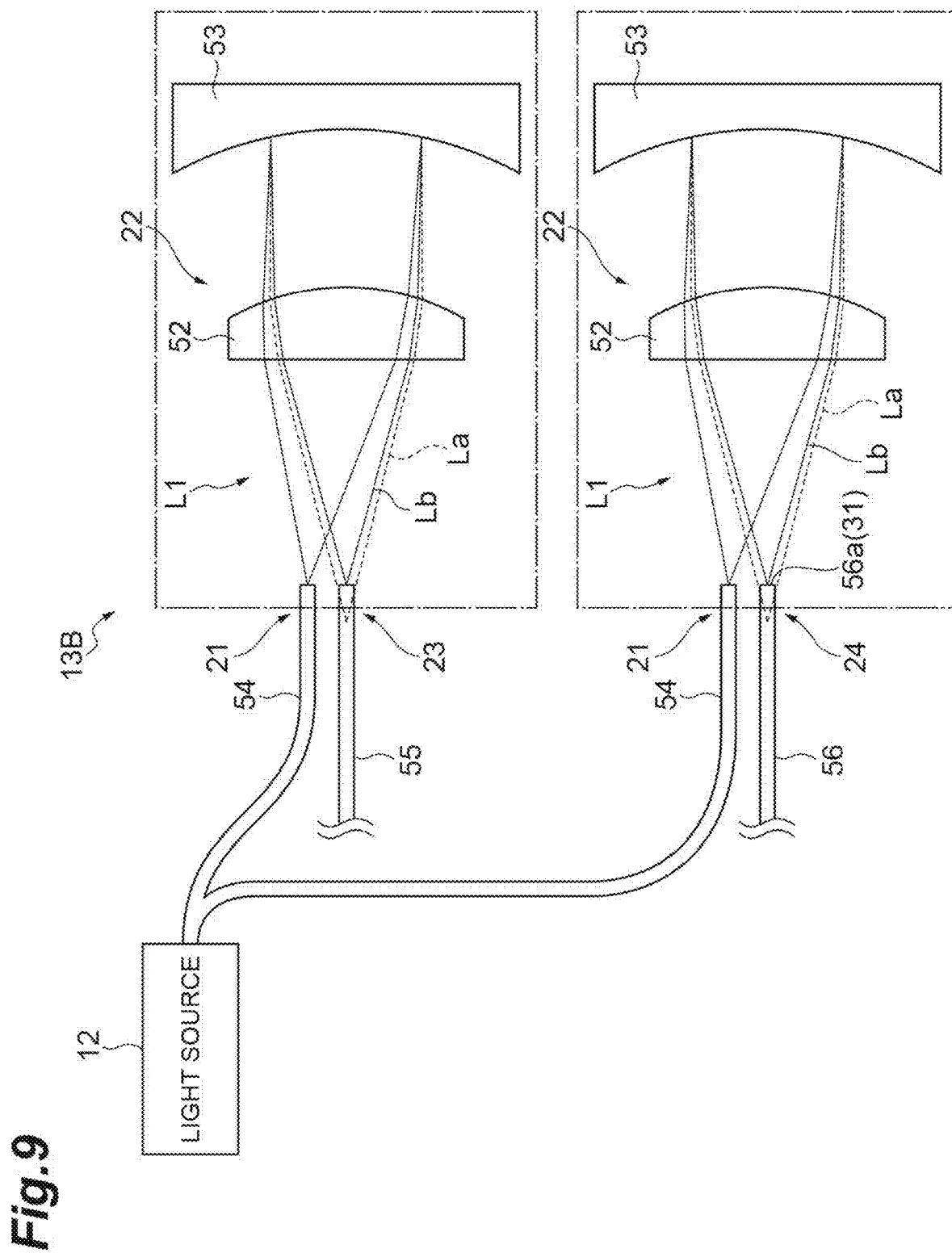
FIG. 9 is a schematic view illustrating still another modification example of the optical unit.

As illustrated in FIG. 9, the optical unit 13B differs from the foregoing optical unit 13A in that the monitor output portion 23 and the measurement output portion 24 are separate units. Each of the optical system 22 of a unit of the monitor output portion 23 and the optical system 22 of a unit of the measurement output portion 24 has the lens 52 and the ellipsoidal mirror 53. In these optical systems 22, the beam splitter 51 is omitted. In place of disposition of the beam splitter 51, the optical fiber 54 for guiding the measurement light L1 from the light source 12 branches. A shutter for switching between ON and OFF of the measurement light L1 may be disposed between the lens 52 and the optical fibers 54, 55, and 56.

The measurement light L1 output from one of the branched optical fibers 54 passes through the lens 52 in the unit of the monitor output portion 23, is reflected by the ellipsoidal mirror 53 in a state where a chromatic aberration has occurred, and then is incident on the optical fiber 55 serving as the monitor output portion 23. The measurement light L1 output from the other of the branched optical fibers 54 passes through the lens 52 in the unit of the measurement output portion 24, is reflected by the ellipsoidal mirror 53 in a state where a chromatic aberration has occurred, and then is incident on the optical fiber 56 serving as the measurement output portion 24. The input end of the optical fiber 55 does not image the light La having a wavelength in the visible region and images the light Lb having a wavelength in the ultraviolet region of the measurement light L1 having a chromatic aberration having occurred therein. Similarly, the input end 56a of the optical fiber 56 (opening portion 31) does not image the light La having a wavelength in the visible region and images the light Lb having a wavelength in the ultraviolet region of the measurement light L1 having a chromatic aberration having occurred therein.

Also in such an optical unit 13B, the spectral intensity in the ultraviolet region of light output from the opening portion 31 can be relatively increased with respect to the spectral intensity in the visible region. Therefore, the sensitivity of light in the ultraviolet region required in the detection system is likely to be obtained so that a spectrum which is optimal for film thickness measurement can be constituted. In addition, due to miniaturization of the optical unit 13B, space saving of the device when used as an in-line film thickness monitor in the film formation device can be achieved. In this optical unit 13B, although there is a need to dispose an optical component constituting the optical system 22 in each of the optical system 22 of the unit of the monitor output portion 23 and the optical system 22 of the unit of the measurement output portion 24, since the beam splitter 51 is not required, the optical system 22 of each unit can be simplified, and thus easiness of manufacturing can be enhanced.

Figure 10:
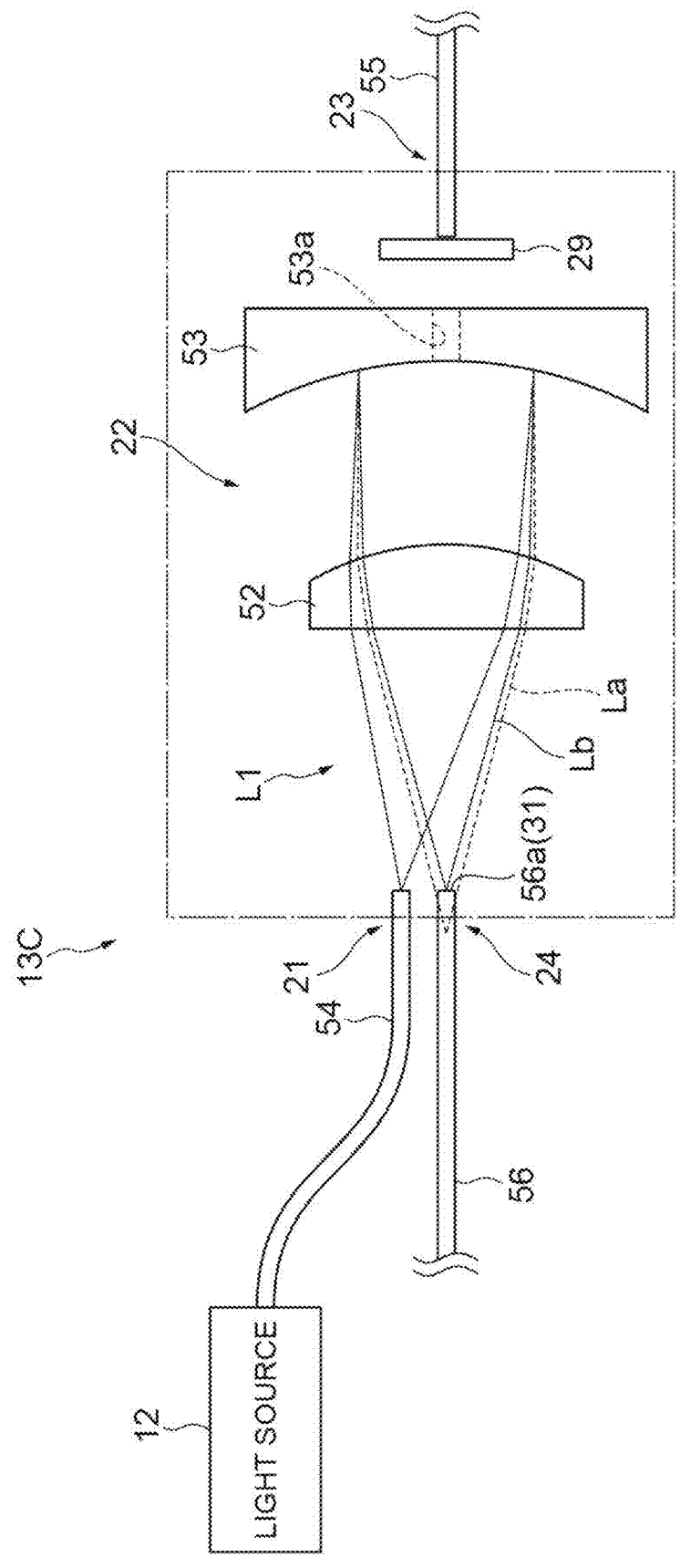
FIG. 10 is a schematic view illustrating still another modification example of the optical unit.

As illustrated in FIG. 10, the optical unit 13C differs from the foregoing optical unit 13A in the constitution of the monitor output portion 23. More specifically, in the optical unit 13C, the beam splitter 51 is not provided in the optical system 22, and a hole portion 53a is provided at the center of the ellipsoidal mirror 53 instead. The optical fiber 55 constituting the monitor output portion 23 is disposed on a rear surface side of the ellipsoidal mirror 53 (a side opposite to the optical fiber 56 serving as the measurement output portion 24) so as to correspond to the hole portion 53a. A shutter for switching between ON and OFF of the measurement light L1 may be disposed between the lens 52 and the optical fibers 54 and 56 and between the ellipsoidal mirror 53 and the optical fiber 55. In addition, the diffusion plate 29 may be disposed between the ellipsoidal mirror 53 and the optical fiber 55.

The measurement light L1 output from the light source 12 passes through the lens 52, is reflected by the ellipsoidal mirror 53 in a state where a chromatic aberration has occurred, and then is incident on the optical fiber 56 serving as the measurement output portion 24. The input end 56a of the optical fiber 56 (opening portion 31) does not image the light La having a wavelength in the visible region and images the light Lb having a wavelength in the ultraviolet region of the measurement light L1 having a chromatic aberration having occurred therein. In the ellipsoidal mirror 53, a part of the measurement light L1 passes through the hole portion 53a and is incident on the optical fiber 55 serving as the monitor output portion 23.

Also in such an optical unit 13C, the spectral intensity in the ultraviolet region of light output from the opening portion 31 can be relatively increased with respect to the spectral intensity in the visible region. Therefore, the sensitivity of light in the ultraviolet region required in the detection system is likely to be obtained so that a spectrum which is optimal for film thickness measurement can be constituted. In addition, due to miniaturization of the optical unit 13C, space saving of the device when used as an in-line film thickness monitor in the film formation device can be achieved. In the optical unit 13C, the spectral intensity in the ultraviolet region is relatively increased in only the measurement output portion 24. However, depending on the purpose of the optical unit 13C, this constitution can be employed when relative increase of the spectral intensity in the ultraviolet region in the monitor output portion 23 is not required. When the diffusion plate 29 is disposed between the ellipsoidal mirror 53 and the optical fiber 55, a monitor signal can be made stable.

Figure 11:
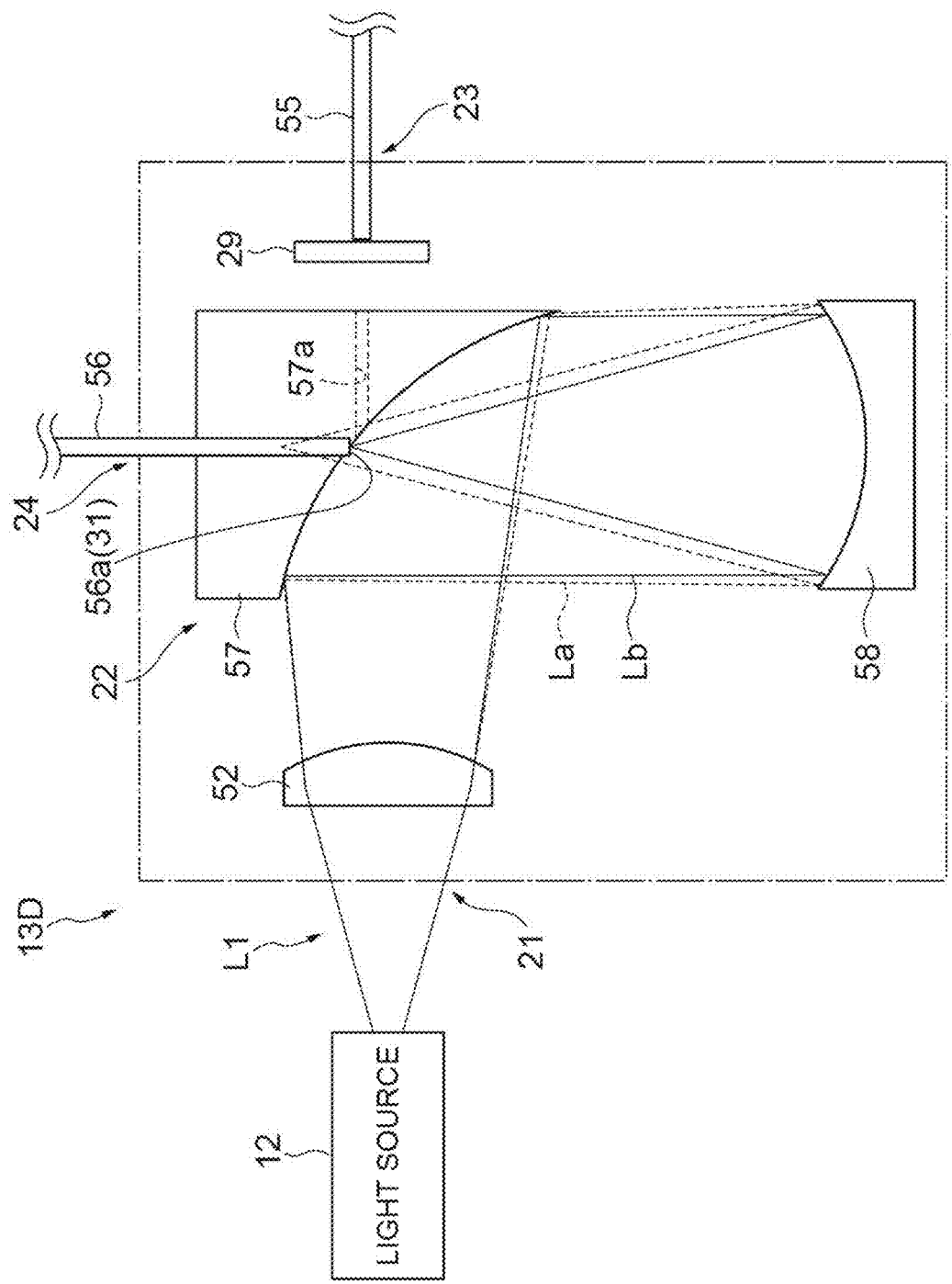
FIG. 11 is a schematic view illustrating still another modification example of the optical unit.

As illustrated in FIG. 11, the optical unit 13D is optically connected to a head output-type light source 12. The optical system 22 of the optical unit 13D has the lens 52, a parabolic mirror 57 and a parabolic mirror 58. For example, the parabolic mirror 57 is an off-axis parabolic mirror. The parabolic mirror 58 can also be replaced with a spherical mirror which is less expensive. A hole portion 57a extending in a direction in which it faces the input portion 21 is provided at the center on a reflection surface in the parabolic mirror 57. The optical fiber 55 constituting the monitor output portion 23 is disposed on a rear surface side of the parabolic mirror 57 (a side opposite to the input portion 21) so as to correspond to the hole portion 57a. The diffusion plate 29 may be disposed between the parabolic mirror 57 and the optical fiber 55.

In addition, the optical fiber 56 constituting the measurement output portion 24 in a direction in which it faces the parabolic mirror 58 is inserted into the center on the reflection surface in the parabolic mirror 57. The input end 56a of the optical fiber 56 (opening portion 31) is in a state of being exposed on the reflection surface of the parabolic mirror 57 at a position adjacent to the hole portion 57a. A shutter for switching between ON and OFF of the measurement light L1 may be disposed between the parabolic mirror 57 and the parabolic mirror 58 and between the parabolic mirror 57 and the optical fiber 55.

The measurement light L1 output from the light source 12 is guided into the optical unit 13D via the input portion 21 and is transmitted through the lens 52. A chromatic aberration occurs in the measurement light L1 which has passed through the lens 52 due to dispersion of the lens material. Thereafter, a part of the measurement light L1 passes through the hole portion 57a from the reflection surface of the parabolic mirror 57 and is incident on the optical fiber 55 serving as the monitor output portion 23. The rest of the measurement light L1 is collimated by the parabolic mirror 57 and is reflected by the parabolic mirror 58. The rest of the measurement light L1 which has been reflected by the parabolic mirror 58 and has returned to the parabolic mirror 57 is incident on the optical fiber 56 serving as the measurement output portion 24 on the reflection surface of the parabolic mirror 57. The input end 56a of the optical fiber 56 (opening portion 31) does not image the light La having a wavelength in the visible region and images the light Lb having a wavelength in the ultraviolet region of the measurement light L1 having a chromatic aberration having occurred therein.

Also in such an optical unit 13D, the spectral intensity in the ultraviolet region of light output from the opening portion 31 can be relatively increased with respect to the spectral intensity in the visible region. Therefore, the sensitivity of light in the ultraviolet region required in the detection system is likely to be obtained so that a spectrum which is optimal for film thickness measurement can be constituted. In addition, due to miniaturization of the optical unit 13D, even when the head output-type light source 12 is used, space saving of the device when used as an in-line film thickness monitor in the film formation device can be achieved. In the optical unit 13D, the spectral intensity in the ultraviolet region is relatively increased in only the measurement output portion 24. However, depending on the purpose of the optical unit 13D, this constitution can be employed when relative increase of the spectral intensity in the ultraviolet region in the monitor output portion 23 is not required. When the diffusion plate 29 is disposed between the parabolic mirror 57 and the optical fiber 55, a monitor signal can be made stable.

REFERENCE SIGNS LIST

1 Film thickness measurement device
12 Light source
13 (13A to 13D) Optical unit
14 Detection portion
15 Analysis portion
17 Optical fiber (light guide portion)
18, 56 Optical fiber (light guide portion)
17a, 56a Input end (opening portion)
21 Input portion
22 Optical system
26, 52 Lens
27, 57, 58 Parabolic mirror
29 Diffusion plate
31 Opening portion
41 Plane parallel plate
42 Wedge prism
43 Pin hole (opening portion)
L1 Measurement light (light)
L2 Detected light
La Light having wavelength in visible region
Lb Light having wavelength in ultraviolet region
S Measurement object

The invention claimed is:

1. An optical unit comprising:
an input portion comprising an aperture configured to have light having a wavelength extending from an ultraviolet region to a visible region input thereto;
an optical system comprising one or more optical elements configured to condense the light in a state where a chromatic aberration is caused to occur; and
an opening portion comprising an input end toward an optical fiber configured not to image light having a wavelength in the visible region and to image light having a wavelength in the ultraviolet region of the light having the chromatic aberration having occurred therein.

2. The optical unit according to claim 1, wherein the optical system further includes a diffusion plate disposed along an optical axis of the light.

3. The optical unit according to claim 2, wherein the diffusion plate is disposed along the optical axis of the light between the optical system and the opening portion.

4. The optical unit according to claim 1, wherein the optical system is configured to include a lens and a parabolic mirror.

5. The optical unit according to claim 1, wherein the optical system is configured to include a plane parallel plate or a wedge prism, and a parabolic mirror.

6. The optical unit according to claim 1, wherein the opening portion is an input end toward an optical fiber.

7. The optical unit according to claim 1, wherein the opening portion is a pin hole.

8. A film thickness measurement device comprising:
the optical unit according to claim 1;
a light source configured to input light having a wavelength extending from an ultraviolet region to a visible region to the optical unit;
a light guide portion comprising an optical fiber configured to guide light output from the optical unit via the opening portion to a measurement object as measurement light;
a detection portion comprising a spectral detector configured to spectrally detect detected light from the measurement object; and
an analysis portion comprising an integrated circuit configured to analyze a film thickness of the measurement object on the basis of detection results of the detection portion.

9. The film thickness measurement device according to claim 8, wherein the light input from the light source to the optical unit includes a wavelength range of 200 nm to 300 nm.

10. The film thickness measurement device according to claim 8, wherein the light input from the light source to the optical unit includes a wavelength range of 300 nm to 800 nm.

11. The film thickness measurement device according to claim 8, wherein the light input from the light source to the optical unit includes a wavelength range of 300 nm to 1,100 nm.

* * * * *